United States Patent [19]
Dimatteo et al.

[11] Patent Number: 5,496,102
[45] Date of Patent: Mar. 5, 1996

[54] BRAKE SYSTEM

[75] Inventors: Michael A. Dimatteo, Kettering; Schuyler S. Shaw, Dayton; Michael B. Monahan, Miamisburg; Robert J. Disser, Dayton; Jeff A. Foust, Eaton; Paul D. Wilkey, Vandalia; Gary C. Fulks, Spring Valley, all of Ohio

[73] Assignee: General Motors Corporation, Detroit, Mich.

[21] Appl. No.: 397,675

[22] Filed: Mar. 2, 1995

[51] Int. Cl.$^6$ .................................................. B60T 8/58
[52] U.S. Cl. ................................. 303/162; 303/115.2
[58] Field of Search ............................ 303/161, 162, 303/199, 115.2, 115.1; 318/138, 254

[56] References Cited

U.S. PATENT DOCUMENTS

| | | | |
|---|---|---|---|
| 4,909,577 | 3/1990 | Harrison et al. | 303/115 |
| 4,922,121 | 5/1990 | Taft | 303/115 |
| 4,928,797 | 5/1990 | Harrison | 188/156 |
| 4,941,553 | 7/1990 | Harrison | 188/156 |
| 4,957,331 | 9/1990 | Burton et al. | 303/115 |
| 5,000,524 | 3/1991 | Savage | 303/162 X |
| 5,071,199 | 12/1991 | Spadafora et al. | 303/162 |
| 5,074,388 | 12/1991 | Dodd et al. | 188/156 |
| 5,219,214 | 6/1993 | Savage et al. | 303/162 X |
| 5,264,767 | 11/1993 | Chin et al. | 303/161 X |
| 5,320,421 | 6/1994 | Kade et al. | 303/162 |

*Primary Examiner*—Josie Ballato
*Attorney, Agent, or Firm*—Anthony Luke Simon

[57] ABSTRACT

A brake system comprising a hydraulic brake, wherein the brake includes a displaceable braking surface, wherein the hydraulic brake requires low pressure to effect displacement during initiation of a brake apply and increased pressure to effect displacement as brake apply progresses, wherein the increased pressure exponentially increases in a non-linear response curve, a motor driven hydraulic actuator having a rotary input provided by a motor and a hydraulic output coupled to the hydraulically actuated brake, wherein the rotary input requires low torque during the initiation of brake apply to effect displacement of the hydraulically actuated brake and requires increased torque to effect rotary motion and displacement of the hydraulically actuated brake as brake apply progresses, the motor characterized by a progressively changing non-linear operation having a low torque mode and a high torque mode, and a control apparatus for the motor controlling the motor to effect displacement of the hydraulic brake, wherein the motor provides increased torque versus displacement in an exponentially increasing non-linear response curve and wherein the motor provides maximum velocity versus displacement in an exponentially decreasing non-linear response curve, wherein the brake system minimizes apply time of the hydraulically actuated brake.

8 Claims, 6 Drawing Sheets

BRAKE SYSTEM

This invention relates to a brake system with a motor driven hydraulic actuator.

BACKGROUND OF THE INVENTION

A known type of brake system includes a motor driven hydraulic actuator in the hydraulic circuit of the brake. The motor driven hydraulic actuator converts rotational output from the motor into linear movement of the hydraulic piston that moves reciprocally, within a piston cylinder, responsive to output rotation of the motor to provide a desired control of the hydraulic fluid pressure in the hydraulic brake system. Such modulators are used in anti-lock brake systems, traction control systems and/or brake-by-wire systems.

SUMMARY OF THE PRESENT INVENTION

It is an object of this invention to provide a brake system in accordance with claim 1. Advantageously, this invention provides a brake system with a motor driven hydraulic actuator in which the motor is controlled in the manner to optimize performance of the motor driven hydraulic actuator. More particularly, improvements according to this invention are provided to advantageously increase the stall torque of the motor of the hydraulic actuator and increase the response time of the hydraulic actuator through the advantageous motor and control implemented according to this invention.

Advantageously, a preferred example brake system according to this invention comprises a hydraulic brake, wherein the brake includes a displaceable braking surface, wherein the hydraulic brake requires low pressure to affect displacement during initiation of a brake apply and increased pressure to affect displacement as brake apply progresses, wherein the increased pressure exponentially increases in a non-linear response curve, a motor driven hydraulic actuator having a rotary input provided by a motor and a hydraulic output coupled to the hydraulically actuated brake, wherein the rotary input requires low torque during the initiation of brake apply to affect displacement of the hydraulically actuated brake and requires increased torque to affect rotary motion and displacement of the hydraulically actuated brake as brake apply progresses, the motor characterized by a progressively changing non-linear operation having a low torque mode and a high torque mode; and a control apparatus for the motor controlling the motor to affect displacement of the hydraulic brake, wherein the motor provides increased torque versus displacement in an exponentially increasing non-linear response curve and wherein the motor provides maximum velocity versus displacement in an exponentially decreasing non-linear response curve, wherein the brake system minimizes apply time of the hydraulically actuated brake.

BRIEF DESCRIPTION OF THE DRAWINGS

The present invention will now be described, by way of example, with reference to the accompanying drawings, in which.

DETAILED DESCRIPTION OF THE INVENTION

Figure 1:
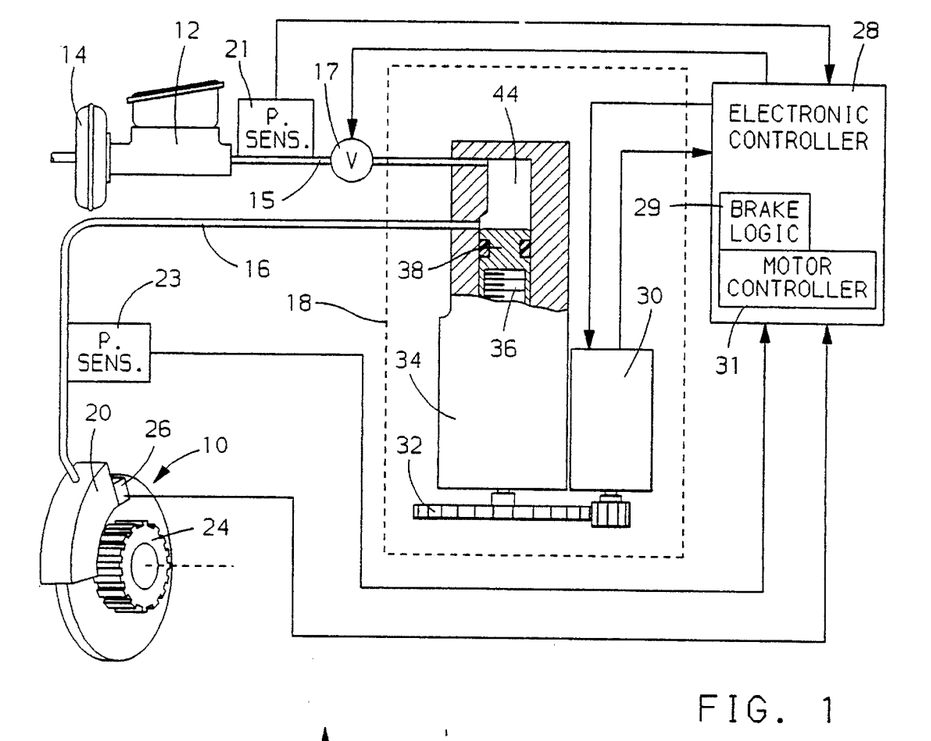
FIG. 1 illustrates an example schematic brake system according to this invention.

The brake system shown includes, in general, brake unit 10 operated by hydraulic pressure provided by a master cylinder 12 and a hydraulic boost unit 14 operated by the vehicle operator. The hydraulic fluid under pressure from the master cylinder 12 is provided to the brake unit 10 via brake line 15, valve 17 and a pressure modulator 18. The brake unit 10 is illustrated as a disc brake system that includes a caliper 20 located at a rotor 22. The wheel includes a wheel sensing assembly comprised of an exciter ring 24 that rotates with the wheel and an electromagnetic sensor 26 that monitors the rotation of the exciter ring to provide a signal having a frequency proportional to the rotational speed of the wheel. The wheel rotational speed signal from the sensor 26 is provided to a microprocessor based electronic controller 28 that includes a microprocessor 29. The pressure modulator 18 is controlled by the electronic controller 28 in a known manner to limit the brake pressure applied to the wheel brake assembly 10 to prevent wheel lock-up and/or to provide brake by wire braking in a known manner by closing valve 17. In the event a brake by wire control is implemented, it may be desirable to include a hydraulic accumulator of a known type coupled to master cylinder 12 to preserve conventional pedal feel.

In general, when the control senses a braking condition where at the wheel is approaching an incipient wheel lock-up, the pressure modulator 18 is controlled to regulate the braking pressure to the wheel to maintain the braking of the wheel in a stable braking region. The pressure modulator example shown includes a motor 30 having an output shaft that drives a gear train 32 that, in turn, rotates a linear ball screw actuator 34. The ball screw actuator contains a linearly stationary ball screw that when rotated, linearly positions a nut 36. The nut 36 terminates in a piston 38. As the linear ball screw rotates, the piston 38 is either extended or retracted depended on the direction of rotation of the torque motor 30. Modulator 18 includes a housing in which a cylinder 42 is formed. The piston 38 is reciprocally received within the cylinder 42. The cylinder 42 forms a portion of the fluid path between the master cylinder 12 and the wheel brake 10.

In one example, included within this fluid path is a normally closed ball check-valve of a known type (not shown) that, when closed, isolates the master cylinder 12 from the wheel brake unit 10. The ball check valve is operated to an open position by the piston 38 when it is positioned in an extended (home) position within the cylinder 42. When the ball screw check valve is open, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator.

However, when motor 30 is operated by the electronic controller 28 to modulate the braking pressure in the wheel brake unit 10, the piston 32 is retracted allowing the ball check valve to seek and isolate the master cylinder 12 from the wheel brake unit 10 as long as the pressure in the cylinder 42 is less than the pressure from the master cylinder 12. Further retraction of the piston 38 functions to increase the volume of the cylinder 42 thereby decreasing the pressure applied to the wheel brake unit 10. By controlling the motor 30 in a known manner, a pressure at the wheel brake can therefore be modulated to control values less than the master cylinder 12 pressure output until such time that the piston 38 again unseats the ball check valve or until the pressure generated by the pressure modulator at the wheel brake 10 exceeds the fluid pressure output of the master cylinder 12. When this latter condition exists, the ball check valve is opened by the differential fluid pressure, which limits the pressure of the wheel brake unit 10 at the master cylinder 12 pressure. In this manner, the wheel cylinder pressure can never exceed the operator's established pressure.

In a brake by wire implementation, the ball check valve is not included and the brake system controller 28 senses depression of the brake pedal and, via pressure sensor 21, measures the master cylinder 12 brake pressure. In response to the measured brake pressure, electronic controller 28 determines a desired brake pressure in brake line 16 and controls motor 30 until that brake pressure is achieved. Pressure feedback is provided from brake line 16 via pressure sensor 23.

In a traction control implementation, the ball check valve is not included and the controller 28 senses wheel slip vis-à-vis the wheel speed sensors 26. In response to the measured wheel slip, electronic controller 28 determines a desired motor torque command and controls motor 30 responsive thereto. The process is repeated until sensed wheel slip falls below a predetermined threshold. This traction control function is usually coordinated with an internal combustion engine control, such as throttle reduction and/or spark retard.

The brake logic 29 in the controller 28 for performing both the anti-lock brake, traction control and brake by wire functions are of a type generally known to those skilled in the art and need not be set forth herein in further detail. Except as provided herein, the motor control 31 function of the controller 31 is of a known type and need not be set forth herein in further detail.

Figure 2A:
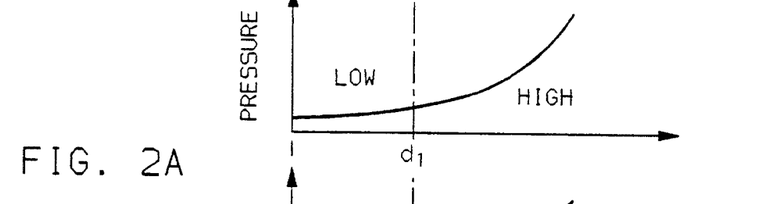
FIGS. 2A, 2B, 2C illustrate example brake system response curves according to this invention.

Referring now to FIG. 2A, the graph illustrates hydraulic pressure increase in the brake system as the brake pads (or shoes) are displaced (moved) closer to the brake disc (or drum). When the brake pad (or shoe) displacement is being controlled by the actuator 18 in FIG. 1, the displacement also corresponds to movement of the piston 38 in the direction toward the top of the cylinder of modulator 34. As can be seen, the pressure response curve exponentially increases as the displacement of the brake pad increases. This is due to the brake pads coming in contact with the disc of the disc brake 10 (FIG. 1).

The portion of the graph to the left of the position $d_1$, is designated the low pressure portion and the portion on the graph to the right of the position $d_1$ is designated the high pressure portion.

Figures 2B, 2C:
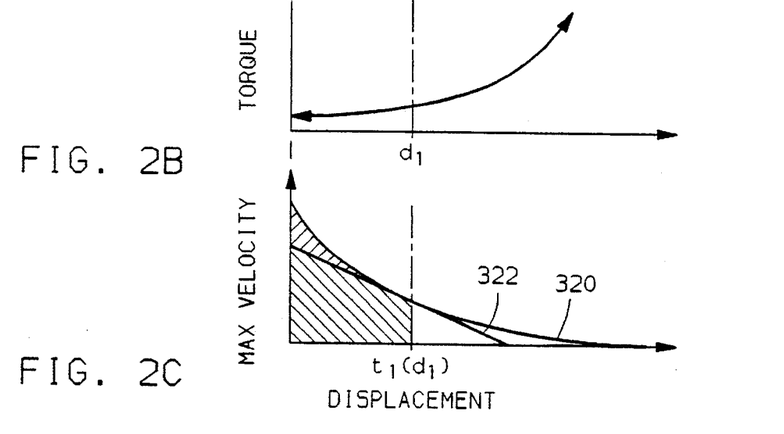

Referring now also to FIG. 2B, the graph shown illustrates that motor torque for the motor 30 also has a exponentially increasing response curve as displacement increases. FIG. 2C plots two response curves, 320 and 322. The traces are plotted against torque on the horizontal axis and maximum available motor velocity on the vertical axis. Trace 322 illustrates a prior art motor implementation with actuator 18 comprising a DC permanent magnet brush motor. As can be seen, the torque versus maximum available velocity profile is a relatively straight line.

According to this invention, however, a motor and control thereof is implemented to provide an exponentially decreasing velocity versus torque curve 320 as shown. Implementing the motor and control thereof into the brake system of this invention provides increased low torque maximum speed on the portion of the graph left of the torque $t_1$ and increases the stall torque of the motor as can be seen by the portion of the trace 320 to the right of torque $t_1$. The area under the graph to the left of torque $t_1$ which occurs at a corresponding displacement $d_1$ is inversely proportional to the time it takes for the motor to obtain the displacement $d_1$. As is readily apparent from FIG. 2C, the added shaded portion under the trace 320 compared to the portion under the trace 322 shortens the amount of time it takes for the motor to achieve a predetermined displacement of the piston of the actuator 34 and of the brake pads of the brake 10.

Figure 3:
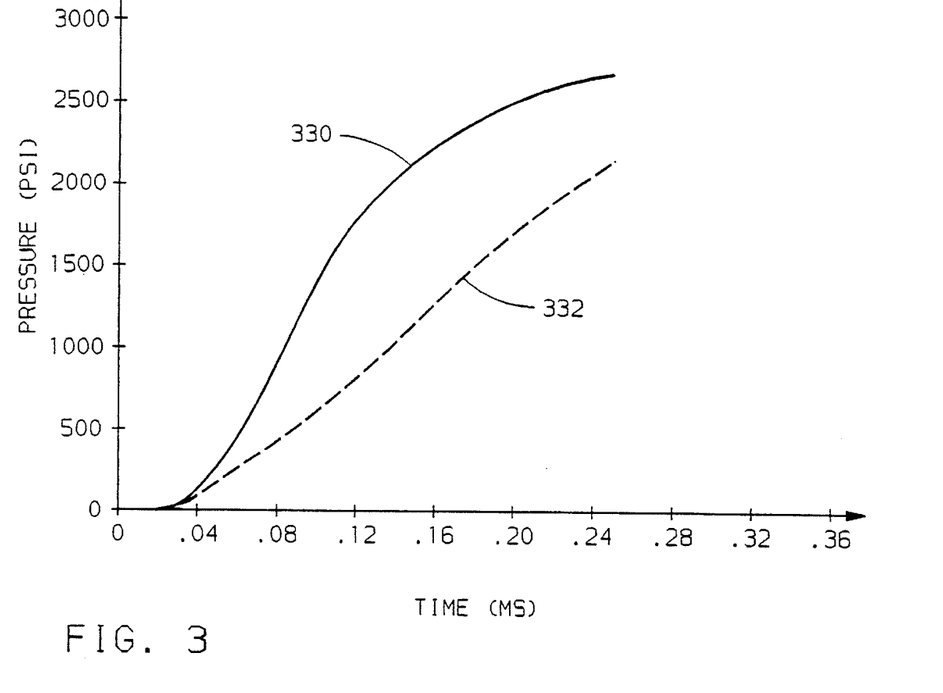
FIG. 3 illustrates example brake system performance according to this invention.

The result of this is shown in the graph in FIG. 3 in which trace 332 is a response curve according to the prior art and trace 330 is a response curve according to an example brake system of this invention. The horizontal axis is timed and the vertical axis is pressure in PSI. Starting at time 0 the prior art trace 332 requires almost 0.24 milliseconds to obtain a pressure of 2000 p.s.i. while the pressure trace 330 according to this invention obtains a pressure of 2000 p.s.i. in under 0.14 milliseconds. The graphed example response of this invention, providing an average response time of over 14,000 p.s.i./millisecond in the range of 0–2000 p.s.i. while the prior an provided a response of approximately 8,300 p.s.i./millisecond in the 0–2000 p.s.i. range, illustrates a 68.9% improvement in the response time to achieve the 2000 p.s.i. level, according to this invention.

Implementation of this invention to achieve these advantages will be further understood by way of the following illustrative examples:

EXAMPLE 1

Figure 4:
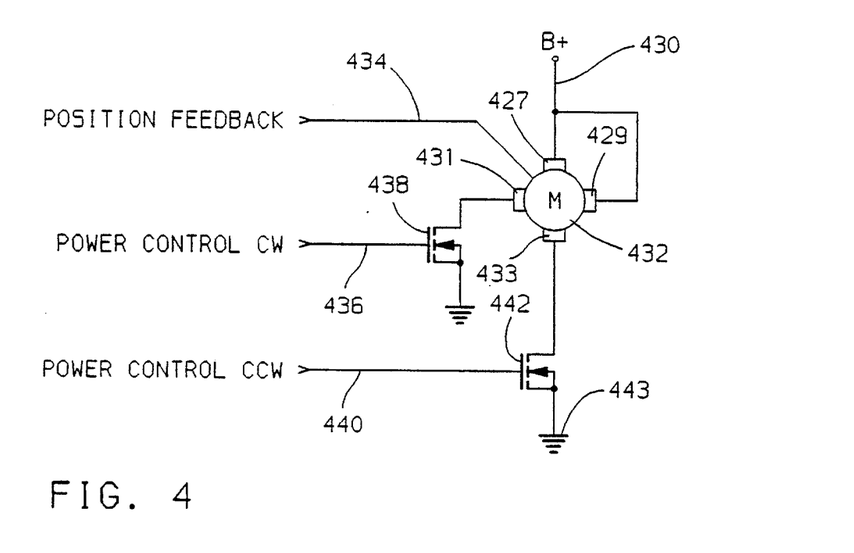
FIG. 4 illustrates an example switched reluctance motor power configuration according to this invention.

Referring now to FIG. 4, switched reluctance motor 432 is shown with four power input terminals 427, 429, 431 and 433. Terminals 427 and 433 provide power during counterclockwise rotation of the motor and terminals 429 and 431 provide power during clockwise rotation of the motor 432. The current path for power provided to the motor is from the +V voltage line 430 to the motor 432, through the solid state transistor 438 or 442, and to ground 443.

When line 440 is controlled so that solid state switch 442 is open and when line 436 is controlled so that solid state switch 438 passes current from terminal 431 to ground 443, the motor 432 rotates in the clockwise direction. When line 436 is controlled so that solid state switch 438 is open and when line 440 is controlled so that solid state switch 442 passes current from terminal 433 to ground 443, the motor 432 rotates in the opposite or counterclockwise direction. PWM signals of a known type control lines 436 and 440 to control the amount of power to the motor 432 by pulse width modulating the switch 438 to move the rotor of motor 432 in the clockwise direction and by pulse width modulating switch 442 to move the rotor in the counterclockwise direction.

In implementations in which motor position feedback is desired, feedback can be sensed in any known manner including use of a position encoder that rotates with the motor rotor together with one or more Hall effect sensors, or any other known type of position feedback providing a position signal on line(s) 434.

Figure 5:
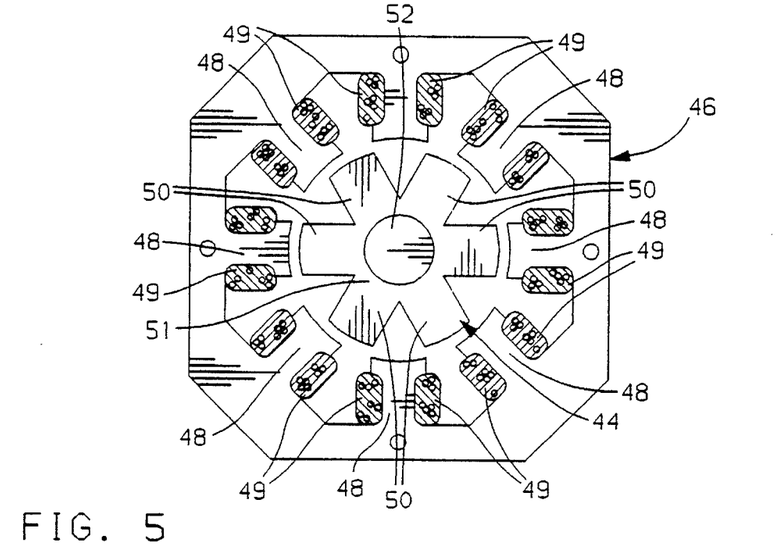
FIG. 5 illustrates an example cross section of a switched reluctance motor incorporating this invention.

Referring to FIG. 5, the cross section of an example switched reluctance motor stator 46 and rotor 44 for use with this invention includes a plurality of stator phase coils 49, each selectively energizing to create magnetic fields through one of the plurality of stator soft magnetic poles 48. The stator 46 shown is a four phase stator in which the coils 49 are energized in four separate phases. There are eight stator coils 49 and soft poles 48 shown because each diametrically opposed pair of coils 49 is energized simultaneously. The rotor 44 comprises core 51 including, in this example, six soft magnetic poles 50. The rotor core 51 is fixedly mounted on motor shaft 52, which is rotatably mounted in the motor housing in a known manner.

The operation of the switched reluctance motor shown generally involves exciting each phase of the stator winding or each diametrically opposed pair of coils 49 in a selected order based on position of the rotor 44. As a coil phase 49 is energized, the magnetic field created by that coil phase 49 acts on the rotor 44, creating a rotational torque tending to align the closest soft pole 50 with the soft pole 48 of the energized phase coil 49. When the soft pole 50 is aligned with the soft pole 48 of the energized phase winding 49, no more rotational torque is provided by that phase coil 49. The energized phase coil 49 is switched off and the next phase coil is energized to act on another of the soft poles 50 to bring that soft pole 50 into rotational alignment with the pole 48 of the energized coil 49.

Figure 6:
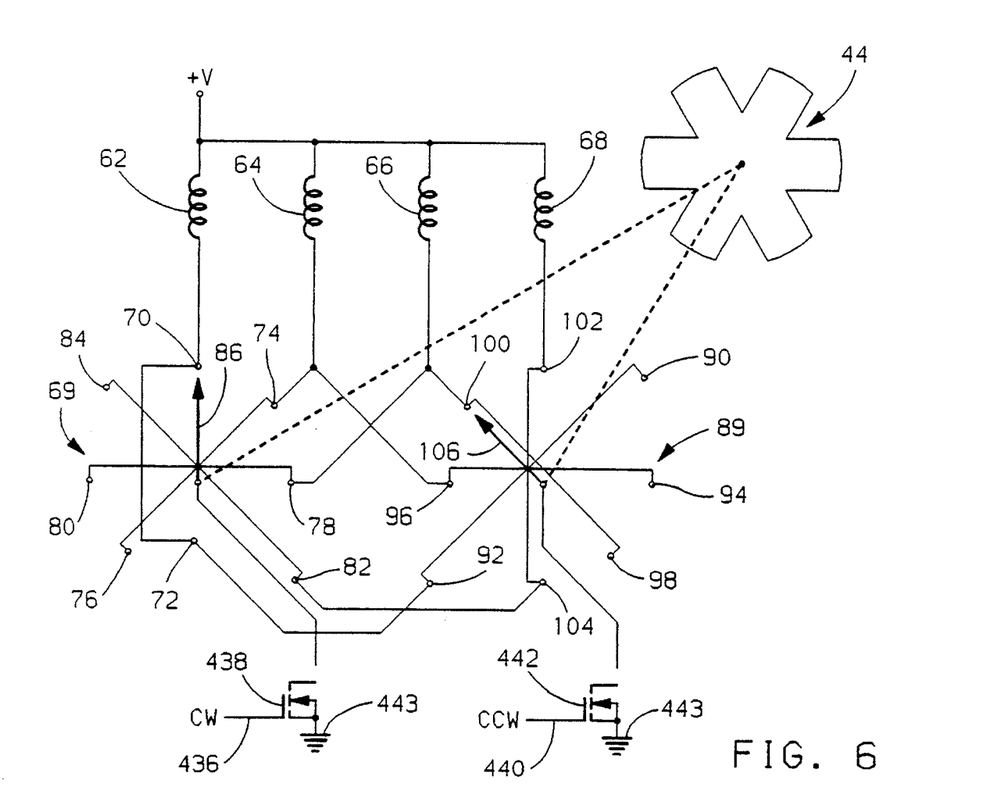
FIG. 6 illustrates an example switched reluctance motor electrical schematic according to this invention.

Referring now to FIG. 6, the electrical schematic for the switched reluctance motor of FIG. 5 includes the phase 1, 2, 3 and 4 stator coils 62, 64, 66 and 68, respectively, commutators 69 and 89 and the solid state switches 438 and 442. In the example shown in FIG. 5, each stator coil 49 has a diametrically opposed stator coil 49, the pair of which are simultaneously activated and deactivated. Each of the coils 62, 64, 66 and 68 in FIG. 6 represents, for the example shown in FIG. 5, a pair of diametrically opposed stator coils (either connected in series or connected in parallel).

One end of each stator phase coil 62, 64, 66 and 68 is connected to the +V voltage supply line 430. The other end of each stator phase coil 62, 64, 66 and 68 is connected to selected contact plates on commutator 69 and on commutator 89. The first phase coil 62 is connected to contact plates 70, 72 on the commutator 69 for clockwise operation of the motor and to contact plates 90 and 92 on commutator 89 for counterclockwise operation of the motor. The second phase coil 64 is connected to contact plates 74, 76 on the commutator 69 for clockwise operation and to contact plates 94 and 96 on the commutator 89 for counterclockwise operation. The third phase coil 66 is connected to contact plates 78 and 80 on the commutator 69 for clockwise operation and to contact plates 98 and 100 on commutator 89 for counterclockwise motor operation. The fourth phase coil 68 is connected to contact plates 82 and 84 on commutator 69 for clockwise operation of the motor and to contact plates 102 and 104 on commutator 89 for counterclockwise operation of the motor.

Each commutator includes at least one rotating brush represented by arrow 86 for commutator 69 and by arrow 106 for commutator 89. The brushes rotate with the motor rotor and, in a consecutive manner, brush 86 makes electrical contact with the contact plates 70–84 during clockwise rotation of the motor rotor and brush 106 makes electrical contact with contact plates 92–104 during counterclockwise rotation of the motor rotor.

Brush 86 is connected to solid state switch 438, which may be a heavy duty FET or, for large duty applications, an IGBT. Brush 106 is electrically connected to similar solid state switch 442. The solid state switches 438 and 442 are alternately controlled. When switch 438 is controlled by line 436 to be closed, providing a closed circuit between brush 86 and ground 443, switch 442 is controlled by line 440 to be open, providing an open circuit between brush 106 and ground 443. When solid state switch 442 is controlled by line 440 to be closed, providing a closed circuit between brush 106 and ground 443, then solid state switch 438 is controlled by line 436 to be open providing an open circuit between brush 86 and ground 443.

In operation of the motor in a clockwise direction, the brush 86 makes contact with one of the contact plates of the commutator 69, providing a closed circuit between one of the stator phase coils 62, 64, 66 and 68 and ground 443, thus energizing the stator phase coil connected to the contact that is making electrical contact with brush 86. The brush 86 is oriented with respect to the contact plates 70–84 such that, when brush 86 contacts a contact causing one of the stator coils to be energized, the energized stator coil acts on the rotor of the motor causing the rotor to turn in the clockwise direction. Since the brush 86 rotates with the rotor, it advances to the next of the contact plates, 70–84, which energizes the next phase coil of the stator winding, causing continued rotation of the rotor 44. The magnitude of electrical power provided to the energized coil and, therefore, the output torque of the motor, are controlled by pulse width modulating the gate of the switch 438 with the control signal on line 436, in which case a larger duty cycle signal on line 436 provides increased rotational torque of the motor.

During rotor rotation in the counterclockwise direction, solid state switch 442 is closed so that brush 106 closes the ground 443 circuit to the coil connected to the contact plate making electrical contact with the brush 106. Brush 106 is oriented with respect to the rotor 44 such that, when one of the contact plates 90–102 is contacted by brush 106, the coil activated acts on one of the poles of rotor 44 to cause the rotor 44 to rotate in the counterclockwise direction. This movement of the rotor 44 causes movement of the brush 106, advancing the brush to the next contact plate 90–102, energizing the next phase coil to cause further counterclockwise rotation of rotor 44. The magnitude of electrical power provided to the energized coil and therefore output torque of the motor is controlled by pulse width modulating the gate of the switch 442 with the control signal on line 40.

Figure 7:
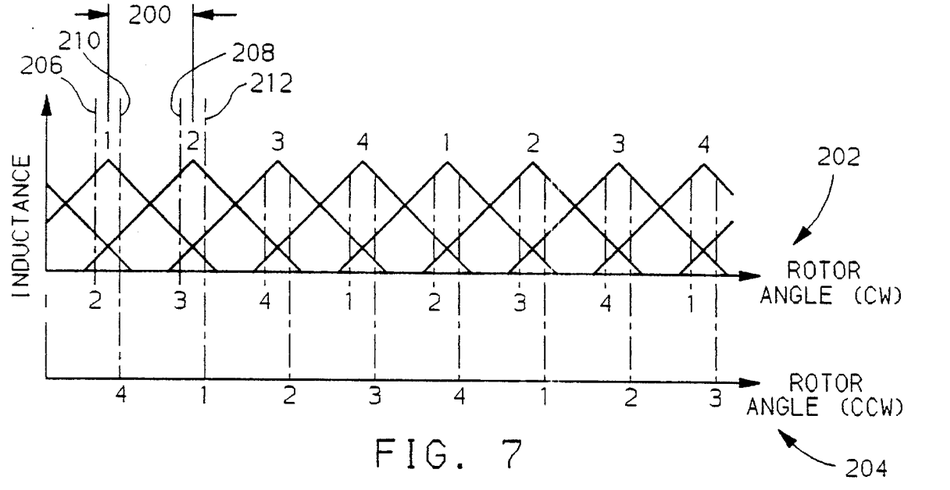
FIG. 7 illustrates example switching of switched reluctance stator phase coils according to this invention.

FIG. 7 shows an inductance map with each peak of the inductance traces corresponding to a rotor position in which a rotor pole aligns to a stator coil. For each stator coil, the stator coil inductance peaks when a pole of the rotor 44 becomes directly aligned with that particular stator coil. Because the stator and rotor are provided with a different number of poles, each phase of the stator coils has a different inductance peak time. For the example in which the stator has four phases and the rotor has three, i.e., the example shown in FIGS. 5 and 6, the inductance map appears as illustrated in FIG. 7. With reference also to FIG. 5, because each stator phase coil 49 has a diametrically opposed coil 49 of the same phase and because each rotor soft pole 50 has a diametrically opposed pole 50 of the same phase, the angular distance between consecutive inductance peaks for each coil phase is 60 degrees of rotor rotation and the angular distance 200 between the first and second phase inductance peaks is 15 degrees of rotor rotation.

The numbers in row 202 illustrate a positioning of the brush 86 in commutator 69 with respect to the peak inductances to affect clockwise rotation of the rotor 44. The numbers corresponding to row 204 illustrate the position of brush 106 in commutator 89 with relation to the peak inductances to affect counterclockwise rotation of rotor 44.

For clockwise rotation, the inductance map is read from left to right because the phases are activated consecutively 1, 2, 3 then 4, then 1 again and the pattern is repeated. For example, in row 202 when the rotor position corresponds to the point on the inductance map referenced 206, and before the rotor position corresponds to the point referenced 208, the second phase coil is activated by brush 106 making electrical contact with one of the contact plates 94 or 96 on commutator 69. Similarly, after the rotor achieves a position corresponding to the point referenced 208, and before obtaining a position corresponding to reference 214, the third coil phase is activated by brush 106 making electrical contact with one of contact plates 78 or 80. The remaining of the phases are activated in a similar manner with the activated phase coils identified by the numbers listed in row 202.

For counterclockwise rotation, the inductance map is read from right to left because the phase coils are activated 4, 3, 2 then 1, then 4 again in a repeating pattern. During the counterclockwise rotation, when the rotor 44 is positioned such that the inductance of phase 1 begins rising, which is a position, for example, corresponding to reference 212 in FIG. 7, the brush 106 is positioned in commutator 89 so that it energizes the first phase of the stator windings by making electrical contact with one of the contact plates 90 and 92. This causes energization of the first phase coil and rotation of rotor 44 with which brush 106 rotates. When the rotor 44 reaches the position 210 on the inductance map, which is the beginning of the rise in inductance in the fourth coil phase, brush 106 is positioned so that it energizes the fourth phase or, in other words, is positioned so that it makes electrical contact with one of the contact plates 102 and 104. The remaining phases are activated in a similar manner with the activated coils identified by the numbers listed in row 202. In this manner, power is selectively applied to brushes 86 and 106 through the solid state switches 38 and 42, providing bi-directional operation control of the switched reluctance motor.

Figure 8:
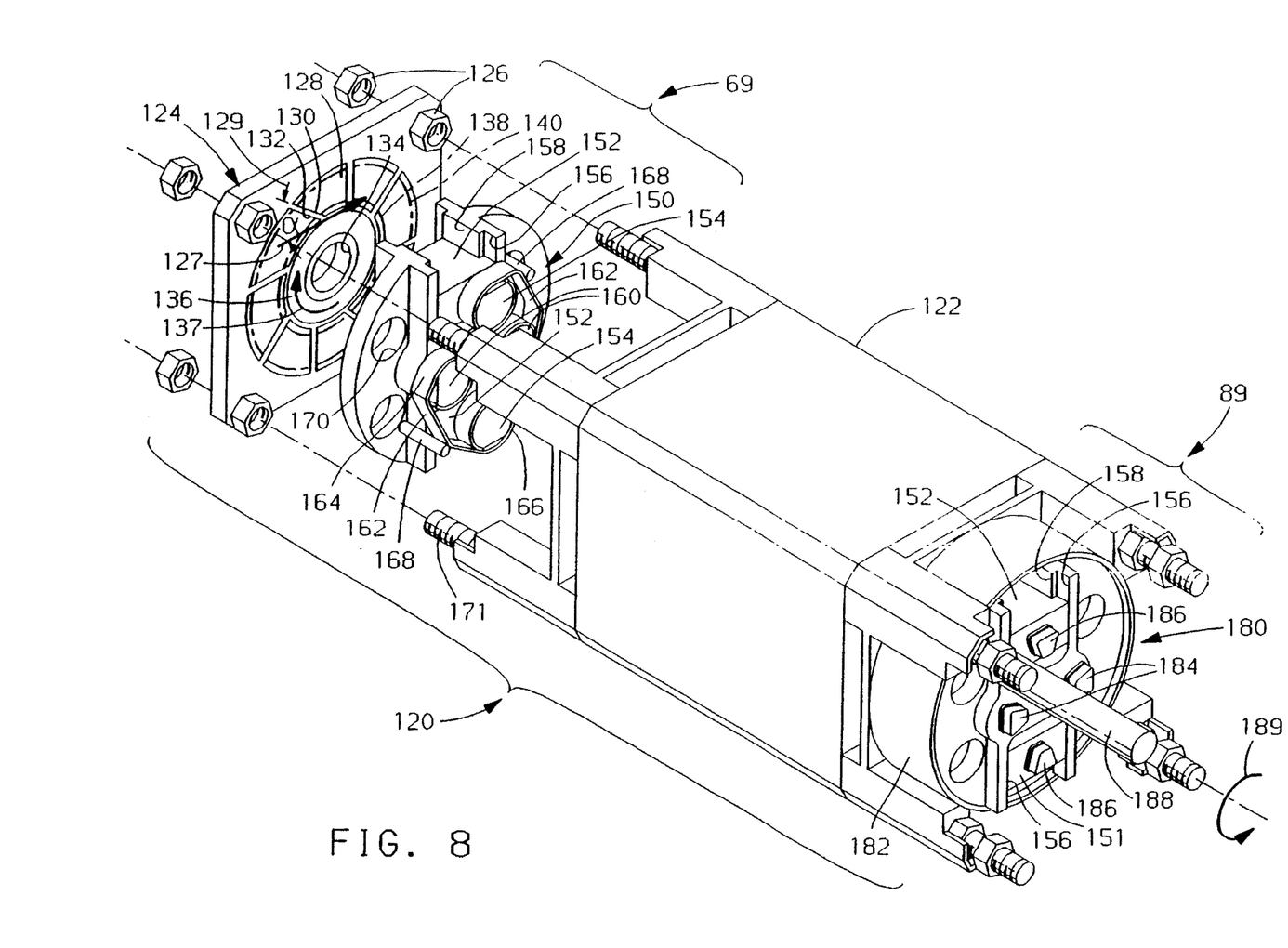
FIG. 8 illustrates an exploded view of an example switched reluctance motor according to this invention.

Referring now to FIG. 8, an example switched reluctance motor apparatus according to this invention is shown. The motor 120 in FIG. 8 comprises motor housing 122 in which is mounted a stator coil of the configuration shown in FIG. 5 and in which is rotationally mounted a rotor, also of the configuration shown in FIG. 5.

Commutators 269 and 289 are provided on the two ends of the motor 120 and each commutator 269 and 289 is identical to the other. Commutator 269 includes commutator plate 124 and commutator brush unit (also referred to as the commutator brush retainer) 150. Commutator 289 includes commutator brush unit 180 and a commutator plate identical to commutator plate 124 but omitted from the drawing so that the brushes 184 and 186 may be viewed. Commutator 289 is shown with brush holder cover 182, which is cylindrical in shape and fixedly mounted to the housing 122. A similar cover for commutator 269 is omitted for clarity. The commutator 269 provides the switching of power to the stator phase windings for clockwise rotation of the motor rotor, or for rotation of the rotor in the direction of arrow 137. Commutator 289 provides the switching of power to the stator phase coils for counterclockwise rotation of the rotor, or for rotation in the direction of arrow 189. The commutator plate 124 includes eight contact plates 128 occupying an annular portion of plate 124, as shown. Each contact plate 128, and its diametrically opposed plate 128, is electrically connected to one of the stator coil phases in the manner shown in FIG. 6.

Radially interior of the eight contact plates 128 is contact ring 127. Contact ring 127 is connected to solid state switch 438 (FIG. 6) and provides power to the commutator brush unit 150. The commutator plate 124 is mounted in place on the housing 122 through nuts 126 threadably engaged with the posts 171 of the housing 122. Central opening 134 of the commutator plate 124 acts as a bearing for the rotor shaft of the motor 120. The brush unit 150 includes brushes 184, 186 and is mounted so that it rotates with the rotor. Each brush 184, 186 faces in a brush direction parallel to the axis of rotation of the rotor and each brush 184, 186 has a brush face on a brush direction side of the brush that engages, or makes sliding contact with, the annular center contact ring 136 (brushes 184) or the eight contact plates 128 (brushes 186).

The brush unit 150 includes two slidably mounted brush holders 152 mounted in slots 156. Guides 158 are provided limiting movements of brush holders 152 to travel in the radial direction with respect to the axis of rotation of the rotor and commutator brush unit 150. To limit sliding friction, linear bearings may be implemented in a known manner. At the back of each slidably mounted brush holder 152 is a post 154.

The brush unit 150 also includes two fixedly mounted brush holders 183 holding brushes 184, which are the contact ring brushes. At the back of each fixedly mounted brush holder 183 is a post 160. Each commutator includes two metal torsion springs 162. Each spring 162 is connected to one of the fixed brush holder posts 160 and to one of the sliding brush holder posts 154. One end 164 of each spring 162 wraps around the post 160 and the other end 166 of each spring 162 wraps around the post 154. Post 168 is provided to maintain the spring 162 in the desired position.

The torsion springs 162 shown maintain the sliding brush holders 152 spring biased to radially inner positions. During operation of the motor when the rotor is rotating, as the motor speed increases, centrifugal force operating on the slidable brush holder 152 counters the bias force of the spring 162. This centrifugal force causes the spring 162 to deflect and allows the sliding brush holder 152 to move incrementally in a radially outward direction within slot 156. The amount of movement of the sliding brush holder 152 in the radially outward direction depends on rotational velocity of the motor rotor.

According to this invention, the brush holder design shown provides, with commutator plate 124, a change in phase advance of the stator windings as motor speed increases. The apparatus provides increased phase advance of the switched reluctance motor as the motor speed increases to allow for the attainment of higher operating motor speeds. To provide for this phase advance, according to this invention, commutator plate 124 includes contact plates 128, each having a leading edge 130 at an acute angle 129 to a vector 127 tangent to the direction of rotation of the rotor at the radially inner position of the annular portion occupied by the contact plate 128. This angle alpha identified by reference 129 in the figure provides a phase advance operation of the motor as the motor speed increases.

During low speed operation of the motor, the brushes 186 travel along path 138 at the radially inner portion of contact plates 128. During high speed operation of the motor, the path of the brushes 186 moves radially outward toward the path 140 on a radially outer portion of contact plates 128. Because the leading edge 130 of the contact plate 128 is at the angle alpha to a vector 127 tangent to the direction of rotation of the motor, as the sliding brush holder 152 moves radially outward in brush unit 150, the brushes 186 first contact each contact plate 128 at an angularly advanced position with respect to first contact of the same contact plate during slower rotational velocities of the motor rotor. Thus, according to this invention, the commutator is provided with a mechanical phase advancing operation.

In the motor shown, commutator 269 is energized by providing power to the contact ring 136 from the solid state switch 438 (FIG. 6) and the commutator 289 is energized by providing power to a similar contact ring on the other commutator plate (not shown) from the solid state switch 442 (FIG. 3). When one of the solid state switches 438, 442 is closed, power flows through the energized phase coil, to the contact plate 128 contacting a brush 186, through the brush 186, through the torsion spring 162, through the brush 184 and through the contact ring 136 to the switch 438 or 442 (whichever is closed) and to ground.

In the above example, the number n of stator coil phases is four and the number m of soft magnetic rotor pole phases is three. This invention can be implemented in a motor with any suitable or known combination of coil phases and rotor pole phases.

The motor control scheme provided by this invention as shown in FIGS. 4–8 eliminates the necessity of the conventional H-bridge for providing servo motor control, thus eliminating at least two solid state switches without requiring the addition of a –V voltage supply line.

Further, the desirable response curve of the motor is provided by the commutators 69 and 89 provide, vis-à-vis, the sliding brush action and the shape of the contact plates 129 to affect the desired phase advance of the motor stator coils. This structure provides the increased torque versus brake pad displacement in an exponentially increasing non-linear response curve according to this invention (FIG. 2b) and provides maximum velocity versus brake pad displacement in an exponentially decreasing non-linear response curve according to this invention (FIG. 2c) to minimize apply time of the hydraulically actuated brake.

In an alternative to the example shown in FIG. 8, instead of including two commutators 69, 89 on each side of the motor, a single commutator with a two-sided commutator plate 124 can be provided, in which case one set of brushes contacts contact plates on one side of the commutator plate 124 and the other set of brushes contacts contact plates on the other side of the commutator plate 124.

Figure 9:
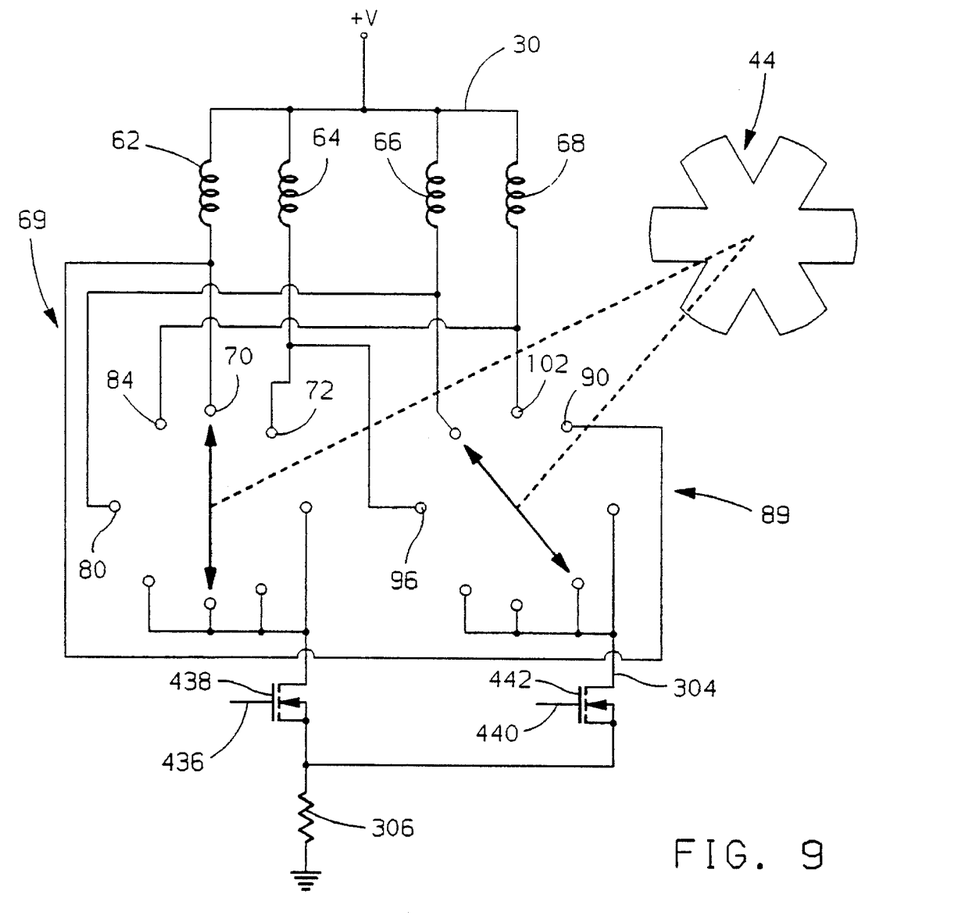
FIG. 9 illustrates an example switched reluctance motor electrical schematic according to this invention.

Referring now to FIG. 9, an alternative schematic to the schematics shown in FIG. 6 is provided that allows elimination of the center ring 136 of FIG. 8. The phase 1, 2, 3 and 4 stator coils 62–68 are shown and are connected to the contacts 70, 74, 80 and 84 of commutator 69 and to contacts 90, 96, 100 and 102 of commutator 89 in the same manner as described above with reference to FIG. 6. However, the remaining contacts of the stator 69 are connected to a common node, line 302, which is connected to transistor 438. In commutator 89, the remaining contacts are connected to a common node, line 304, which is connected to transistor 442. The circuit of the two rotating brushes in each commutator electrically connects the brushes together so that each phase coil is selectively connected to the nodes 302, 304. This allows modification for the motor shown on FIG. 8, eliminating the center ring and brushes thereof, in which case the two diametrically opposed brushes in the brush holder 152 are connected together and may be implemented with a single torsion spring as opposed to the two torsion springs shown.

EXAMPLE 2

Figure 10:
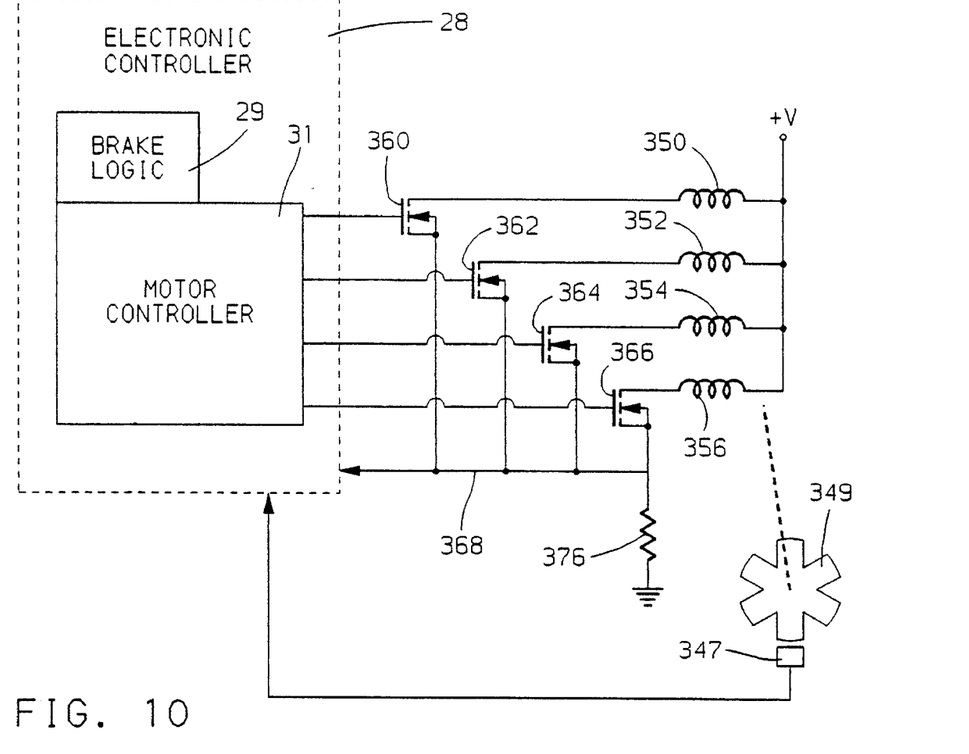
FIG. 10 illustrates an example switched reluctance motor electrical schematic according to this invention.

Referring now to FIG. 10, an alternative for the motor and control apparatus shown in FIGS. 4–9, the motor can be constructed in the manner of a conventional synchronous reluctance motor comprising rotor 349 and a stator of conventional type including coil phases 350, 352, 354 and 356. In a mono-phase operation, the coil phases are selectively activated through a control of the gating transistors 360, 362, 364 and 366, all coupled to line 368 and providing a ground path for the current to the coil 350–356 through sense resistor 370. Line 368 can be provided as current feedback through the electronic controllers 28.

The brake logic 29 and motor control 31 of the controller 28 are of a known type with the exceptions of the modifications herein. Position sensor 347 senses position of the rotor 349 and provides that information to the electronic controller 28.

Figure 11:
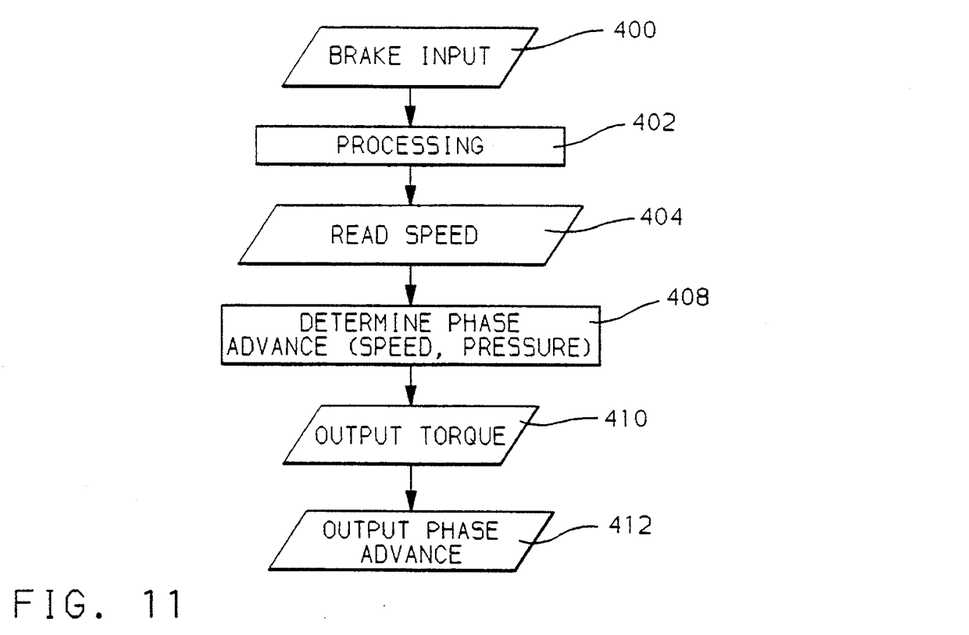
FIG. 11 illustrates an example flow diagram for a control routine for use with this invention as illustrated in FIG. 10.

Referring now to FIG. 11, control of the apparatus of this invention as shown in FIG. 10 begins at block 400 where an input is received, such as from a brake pedal and/or wheel speed sensors, as necessary to achieve anti-lock brake control, brake by wire brake control or traction control utilizing the modulator 18 (FIG. 1) and the motor of a schematic illustrated in FIG. 10.

At block 402 the controller performs known processing of the input to determine whether or not the system should be in ABS mode and, if so, whether or not the brake is in apply or retract mode. Motor torque commands are determined in a known manner. Further, block 402 may determine whether or not the system should be in traction control mode and, if so, to determine whether or not the brakes should be in apply or retract mode and the motor torque commands therefore. In a brake by wire implementation, block 402 determines brake commands responsive to the brake input and motor torque commands responsive thereto. Because the above brake control functions are known to and are achievable by those skilled in the art, further details thereof will not be set forth herein.

At block 404, the speed of rotor 349 is read, for example from input signals provided from position sensor 347.

At block 408, a phase advance for the motor is determined based on at least the motor speed read at block 404 and possibly on brake line 16 pressure. Responsive to the motor speed input, the phase advance is determined in a manner to affect increase in the motor speed, allowing the fastest possible response by the motor. When it is determined that the motor speed has slowed down due to high pressure sensed from line 16, the phase advance is shifted to provide high torque performance, increasing the stall torque of the motor, extending the control range of the brake modulator. Thus, in an example implementation, phase advance is determined so that it is increased in relation to motor speed, such as by a proportionality constant. In another example, phase advance can be further decreased in proportion to brake line torque.

At blocks 410 and 412, the motor torque commands (determined as PWM commands in a known manner at block 402) and the phase advance commands are output to the motor to control the motor torque and the phase advance of the stator windings to control the speed of the motor. In this manner, the response curve line 320 (FIG. 2C) can be obtained so that the overall brake system response as shown by trace 330 in FIG. 3 is obtained, minimizing the response time of the motor to obtain pressure responses in the brake system.

We claim:

1. A brake system comprising:

a hydraulic brake, wherein the brake includes a displaceable braking surface, wherein the hydraulic brake requires low pressure to affect displacement during initiation of a brake apply and increased pressure to affect displacement as brake apply progresses, wherein the increased pressure exponentially increases in a non-linear response curve;

a motor driven hydraulic actuator having a rotary input provided by a motor and a hydraulic output coupled to the hydraulically actuated brake, wherein the rotary input requires low torque during the initiation of brake apply to affect displacement of the hydraulically actuated brake and requires increased torque to affect rotary motion and displacement of the hydraulically actuated brake as brake apply progresses;

the motor characterized by a progressively changing non-linear operation having a low torque mode and a high torque mode; and a control apparatus for the motor controlling the motor to affect displacement of the hydraulic brake, wherein the motor provides increased torque versus displacement in an exponentially increasing non-linear response curve and wherein the motor provides maximum velocity versus displacement in an exponentially decreasing non-linear response curve, wherein the brake system minimizes apply time of the hydraulically actuated brake.

2. The brake system of claim 1 wherein the motor comprises a stator including a first plurality of selectively energized stator coil phases for selectively creating magnetic fields and a rotor rotatably mounted coaxially with the stator including a second plurality of soft magnetic pole phases, wherein the control apparatus controls phase advance of the motor to affect the torque versus displacement and maximum velocity versus displacement response curves.

3. The brake system of claim 2, wherein the control apparatus comprises a microprocessor controller coupled to the motor, monitoring a rotational speed thereof and providing output signals to the motor responsive to the monitored speed and a commanded brake pressure.

4. The brake system of claim 2, wherein the control apparatus comprises:

a rotatably mounted rotor;

a commutator brush retainer mounted fixedly with respect to the rotor, wherein the commutator brush retainer rotates with the rotor;

at least one brush slidably mounted to the commutator brush retainer, wherein the brush is slidable in a radial direction, with respect to an axis of rotation of the rotor, between a radially retracted position and a radially extended position; and a spring connected to the commutator brush retainer and to said one brush, wherein the spring biases the one brush to the radially retracted position and, wherein, during rotational movement of the motor, centrifugal force moves the one brush toward the radially extended position, wherein, as a rotational velocity of the rotor increases, the one brush moves closer to the radially extended position.

5. The brake system of claim 4, also comprising:

a commutator plate mounted fixedly in relation to a housing of the motor, wherein the rotor rotates in relation to the commutator plate;

an annular portion of the commutator plate coaxial with the rotor, the annular portion having an inner radius engaging the one brush when the one brush is in the radially retracted position, the annular portion having an outer radius engaging the one brush when the one brush is in the radially extended position; and a plurality of contactors in the annular portion of the commutator plate, the contactors extending from the inner radius to the outer radius.

6. The brake system of claim 5, wherein, each contactor has a leading edge extending, from the inner radius to the outer radius, at an angle acute to a vector tangent, at the inner radius, to a direction of rotation of the rotor.

7. The brake system of claim 1, wherein the motor and control apparatus comprise:

a stator including a plurality of phase coils;

a rotor rotatably mounted coaxially with the stator;

a first commutator plate comprising a plurality of first contact plates wherein each phase coil of the plurality of phase coils is electrically coupled to a member of the plurality of first contact plates;

a first switching device;

a first rotatably mounted brush consecutively providing electrical contact between each first contact plate and the first switching device;

a second switching device;

a second stator plate comprising a plurality of second contact plates wherein each phase coil of the plurality of phase coils is electrically coupled to a member of the plurality of second contact plates;

a second rotatably mounted brush consecutively providing electrical contact between each second contact plate and the second switching device, wherein, when the first switching device is closed and the second switching device is open, the rotor rotates in a first direction and wherein, when the second switching device is closed and the first switching device is open, the rotor rotates in a second direction opposite to the first direction.

8. A brake system comprising:

a hydraulic brake, wherein the brake includes a displaceable braking surface, wherein the hydraulic brake requires low pressure to effect displacement during initiation of a brake apply and increased pressure to effect displacement as brake apply progresses, wherein the increased pressure exponentially increases in a non-linear response curve;

a motor driven hydraulic actuator having a rotary input provided by a motor and a hydraulic output coupled to the hydraulically actuated brake, wherein the rotary input requires low torque during the initiation of brake apply to effect displacement of the hydraulically actuated brake and requires increased torque to effect rotary motion and displacement of the hydraulically actuated brake as brake apply progresses;

the motor characterized by a progressively changing non-linear operation having a low torque mode and a high torque mode; and a control apparatus for the motor controlling the motor to effect displacement of the hydraulic brake, wherein the motor provides increased torque versus displacement in an exponentially increasing non-linear response curve and wherein the motor provides maximum velocity versus displacement in an exponentially decreasing non-linear response curve, wherein the brake system minimizes apply time of the hydraulically actuated brake and achieves an average brake hydraulic pressure increase response of over 14,000 p.s.i/millisecond in a range of 0–2000 p.s.i.

* * * * *